(12) United States Patent
Ahadian et al.

(10) Patent No.: US 8,276,117 B2
(45) Date of Patent: Sep. 25, 2012

(54) DISPLAYING AND REFACTORING PROGRAMS THAT INCLUDE DATABASE STATEMENTS

(75) Inventors: Azadeh Ahadian, San Jose, CA (US); Stephen Andrew Brodsky, Los Gatos, CA (US); Michael George Burke, Yonkers, NY (US); Rebecca B. Nin, Morgan Hill, CA (US); Igor Peshansky, Emerson, NJ (US); Mukund Raghavachari, Baldwin Place, NY (US); Sonali Surange, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 1414 days.

(21) Appl. No.: 11/833,665

(22) Filed: Aug. 3, 2007

(65) Prior Publication Data

US 2009/0037873 A1 Feb. 5, 2009

(51) Int. Cl.
G06F 9/44 (2006.01)
G06F 17/30 (2006.01)
(52) U.S. Cl. ........ 717/113; 717/111; 717/124; 707/708; 707/758
(58) Field of Classification Search .......... None
See application file for complete search history.

(56) References Cited

U.S. PATENT DOCUMENTS

| | | | |
|---|---|---|---|
| 5,230,049 A * | 7/1993 | Chang et al. ............ | 717/143 |
| 5,640,550 A * | 6/1997 | Coker ..................... | 717/141 |
| 5,701,471 A * | 12/1997 | Subramanyam .......... | 717/124 |
| 5,717,911 A * | 2/1998 | Madrid et al. ............ | 1/1 |
| 5,737,609 A | 4/1998 | Reed et al. | |
| 5,898,838 A * | 4/1999 | Wagner ................... | 709/224 |
| 6,108,660 A * | 8/2000 | Ikeda et al. ............. | 1/1 |
| 6,138,112 A | 10/2000 | Slutz | |
| 6,311,327 B1 * | 10/2001 | O'Brien et al. .......... | 717/114 |
| 6,341,288 B1 * | 1/2002 | Yach et al. .............. | 1/1 |
| 6,378,126 B2 * | 4/2002 | Tang ...................... | 717/143 |
| 6,560,592 B1 | 5/2003 | Reid et al. | |
| 6,581,052 B1 | 6/2003 | Slutz | |
| 6,877,000 B2 * | 4/2005 | Gajda et al. ............. | 1/1 |
| 6,907,546 B1 | 6/2005 | Haswell et al. | |
| 6,978,261 B2 * | 12/2005 | Cotner et al. ........... | 1/1 |
| 7,062,757 B2 | 6/2006 | Honarvar et al. | |
| 7,110,991 B2 * | 9/2006 | Arnold et al. ........... | 1/1 |
| 7,185,000 B1 | 2/2007 | Brown et al. | |
| 7,200,595 B2 | 4/2007 | Dutta et al. | |
| 7,203,928 B2 | 4/2007 | Mandava et al. | |
| 7,343,586 B1 | 3/2008 | Hernandez, III | |
| 7,451,455 B1 | 11/2008 | El-Haj | |
| 7,490,319 B2 | 2/2009 | Blackwell et al. | |

(Continued)

OTHER PUBLICATIONS

George Reese, Database Programming with JDBC and Java, 1st Edition, Jun. 1997, ISBN 1-56592-270-0, published by O'Reilly, pp. 1-15.*

(Continued)

Primary Examiner — Tuan Q Dam
Assistant Examiner — Zheng Wei
(74) Attorney, Agent, or Firm — Patterson & Sheridan, LLP

(57) ABSTRACT

Embodiments of the invention provide techniques for displaying and refactoring of programs, including database statements. In one embodiment, database statements embedded in the program source are evaluated to identify statements of the source code affected by, or affecting, the changed element of the database. An indication of the statements of source code affected by or affecting the changed element of the database may be presented to a user.

24 Claims, 6 Drawing Sheets

U.S. PATENT DOCUMENTS

| | | | |
|---|---|---|---|
| 7,506,315 | B1 | 3/2009 | Kabadiyski et al. |
| 7,577,681 | B1 * | 8/2009 | Rozenman et al. ................... 1/1 |
| 7,603,658 | B2 | 10/2009 | Subramanian et al. |
| 7,664,989 | B2 | 2/2010 | Joshi et al. |
| 7,711,746 | B2 * | 5/2010 | Bernal et al. .................. 707/770 |
| 7,757,175 | B2 | 7/2010 | Miller |
| 7,774,757 | B1 | 8/2010 | Awasthi et al. |
| 7,814,042 | B2 | 10/2010 | Ahmed |
| 7,823,135 | B2 | 10/2010 | Horning et al. |
| 7,836,346 | B1 | 11/2010 | Davidov et al. |
| 7,979,410 | B2 | 7/2011 | Pattabhi et al. |
| 8,024,320 | B1 | 9/2011 | Yehuda et al. |
| 8,032,863 | B2 | 10/2011 | Kolawa et al. |
| 8,078,609 | B2 | 12/2011 | Black |
| 2003/0041052 | A1 * | 2/2003 | Gajda et al. ........................ 707/3 |
| 2003/0084425 | A1 * | 5/2003 | Glaser ........................... 717/110 |
| 2004/0107415 | A1 | 6/2004 | Melamed et al. |
| 2004/0193567 | A1 * | 9/2004 | Dettinger et al. .................. 707/1 |
| 2004/0205691 | A1 | 10/2004 | Poole et al. |
| 2005/0027701 | A1 * | 2/2005 | Zane et al. ........................ 707/3 |
| 2005/0160322 | A1 | 7/2005 | West et al. |
| 2006/0222160 | A1 * | 10/2006 | Bank et al. ............... 379/221.08 |
| 2007/0022480 | A1 * | 1/2007 | Newman ........................ 726/24 |
| 2007/0067350 | A1 * | 3/2007 | Dinh et al. .................... 707/200 |
| 2008/0140696 | A1 * | 6/2008 | Mathuria ...................... 707/102 |

OTHER PUBLICATIONS

Michael Martin et al., "Finding Application Errors and Security Flaws Using PQL: a Program Query Language," OOPSLA, 2005, pp. 365-383.

Vinayak Borkar et al., "Query Processing in the AquaLogic Data Services Platform," VLDB, 2006, pp. 1037-1048.

Ramkrishna Chatterjee et al., "Using Applications of Data Versioning in Database Application Development," Proceedings of the 26th International Conference on Software Engineering, 2004, pp. 1-16.

U.S. Appl. No. 11/833,809, entitled "Coverage Analysis Tool for Database—Aware Applications" by Stephen A. Brodsky et al., filed Aug. 3, 2007.

Office Action History of U.S. Appl. No. 11/833,809 from Feb. 2, 2011 to Aug. 23, 2011.

Leow et al., Automated generation of test programs from closed specifications of classes and test cases, IEEE ICSE, pp. 1-10, 2004.

Tongrak et al., A tool for generating teat case from relational database constraints testing, IEEE, pp. 435-439, 2009.

Whiting et al., Creating realistic scenario based synthetic data for test and evaluation of information analytic software, ACM BELIV, pp. 1-9, 2008.

Sakurai et al., Test based pointcuts a robust pointcut mechanism based on unit test case for software evolution, ACM Workshop Late, 2007.

Ribeiro et al., A strategy for evaluating feasible and unfeasible test cases for the evolutionary testing of object oriented software, ACM AST, pp. 85-92, 2008.

Tsui et al., Analysis of software cohesion attribute and test cases development complexity, ACM, pp. 237-242, 2011.

* cited by examiner

FIG. 2

IDE - SAMPLEPROGRAM.JAVA

```
0010  void SampleProgram (String last_name) {
0020  // get the initial JDNI naming context
0030  Context ctx = new InitialContext();
0040  // Get the DataSource object associated with the logical name
0050  // "jdbc/myDB" and use it to obtain a database connection
0060  DataSource ds = (DataSource) ctx.lookup("jdbc/myDB");
0070  Connection con = ds.getConnection("user","pwd");
0080  Statement stmt = con.creatStatement(ResultSet.CONCUR_UPDATABLE);
0090  ResultSet rs = stmt.executeQuery("SELECT NAME FROM PERSONNEL");
0100  // rs will be updatable
0110  String s = rs.getString("NAME"); // retrieves the
0120  // NAME column value for row 1 (first name)
0130  String full_name = last_name + " , " + s;
0140  rs.updateSring("NAME" , full_name); // updates the
0150  // NAME column for row 1 with full name
0160  rs.updateRow(); // updates the row in the data source
0170  con.close();
0180  }
```

DISPLAYING AND REFACTORING PROGRAMS THAT INCLUDE DATABASE STATEMENTS

BACKGROUND OF THE INVENTION

1. Field of the Invention

Embodiments of the invention are related to tools used to develop application software. More specifically, embodiments of the invention provide techniques for displaying and refactoring programs that include database statements.

2. Description of the Related Art

Today, many software applications are configured to interact with a database. To manage database interactions, the source code of a typical application often includes database statements. As used herein, "database statement" refers to statements that enable a program to retrieve data from, or update/insert data into, the database. One type of database statements includes text strings written in a database query language (e.g., the SQL query language). While it is very useful for an application to access a database, it is often very difficult to develop and debug such an application.

Accordingly, as the foregoing discussion illustrates, there remains a need for techniques for displaying and refactoring programs that include database statements.

SUMMARY OF THE INVENTION

Embodiments of the invention provide techniques for displaying and refactoring programs including database statements. One embodiment of the invention includes a method for refactoring source code of an application in response to changes to a database accessed by the application. The method may generally include detecting a change to an element of the database, identifying one or more database statements embedded in the source code of the application, and examining each of the one or more database statements embedded in the program source code to identify statements of the source code affected by or affecting the changed element of the database. Once identified, the method may also include presenting a developer with an indication of the statements of source code affected by or affecting the changed element of the database.

Another embodiment of the invention includes a computer-readable medium containing a program, which, when executed performs an operation for refactoring source code of an application in response to changes to a database accessed by the application. The operation may generally include detecting a change to an element of the database, identifying one or more database statements embedded in the source code of the application, and evaluating each of the one or more database statements embedded in the program source code to identify statements of the source code affected by or affecting the changed element of the database. The operation may also include presenting a developer with an indication of the statements of source code affected by or affecting the changed element of the database.

Still another embodiment of the invention includes a system having a processor and a memory containing a program, which when executed on the processor, is configured to perform an operation for refactoring source code of an application in response to changes to a database accessed by the application. The operation may generally include detecting a change to an element of the database, identifying one or more database statements embedded in the source code of the application, evaluating each of the one or more database statements embedded in the program source code to identify statements of the source code affected by or affecting the changed element of the database, and presenting to a developer an indication of the statements of source code affected by or affecting the changed element of the database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 illustrates an example IDE displaying source code including embedded database statements, according to one embodiment of the invention.

DETAILED DESCRIPTION OF THE PREFERRED EMBODIMENTS

Figure 1:
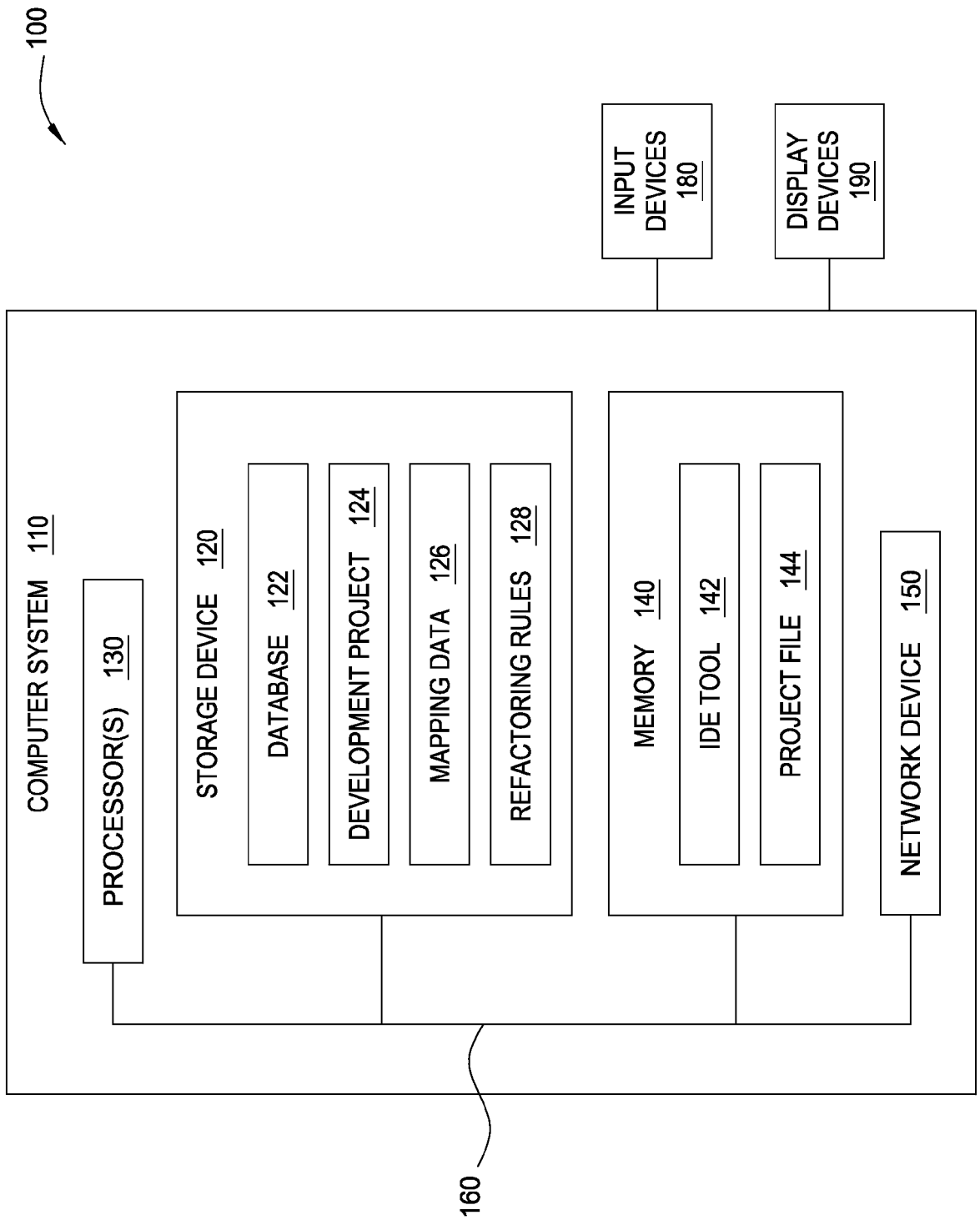
FIG. 1 is a block diagram that illustrates an example view of a computing environment, according to one embodiment of the invention.

Embodiments of the invention provide techniques for displaying and refactoring programs that include embedded database statements. Generally, programs may include database statements to retrieve data from, or update/insert data into, a database. One type of database statement includes text strings written in a database query language (e.g., the SQL query language). For example, the following source code fragment illustrates an embedded SQL query using the Java® programming language:

```
public interface get_data {
    // create connection to database
    @select sql= ("select column_A, column_B from database.table");
    // execute sql statement
    // process query results
```

In the above source code fragment, the text string "select column_A, column_B from database.table" is a database statement. Another type of database statement includes commands available in the programming language (rather than a database query language) for interacting with the database. Some examples of this type of database statement may include commands for opening or closing a database connection, or commands for updating the database. Frequently, an application program interface (API) may provide a set of functions used to connect to and access a database. For example, the well known JDBC specification (Java Database Connectivity) provides an API specification for connecting programs written in Java® to data in popular databases. The JDBC API allows a developer to encode an access request statement in SQL that is then passed to the program that manages the database. Statement results may be returned through a similar interface.

One common problem for this class of programs occurs when database statements include incorrectly written commands of a query language. Another common problem occurs when elements of the database are changed, but the database statements in program source code that refer to those elements are not updated accordingly. Changes to elements of databases (e.g., tables, columns, indexes, and the like) are not uncommon, and may occur without any awareness on the part of a developer of a program that interacts with the changed database. For example, a column may be renamed, an index may be deleted, a schema of a table may be changed, etc. In such situations, any database statements that include hard-coded references to the changed database elements may cause the program to fail.

Further, when one of the above-described problems does occur, identifying the source of the problem can also be difficult. For example, an incorrectly written database statement may cause a program variable to be assigned a wrong value. This problem may not be manifested until it causes an error in another program statement that uses the variable to perform a calculation. Thus, although the cause of the problem is the faulty database statement, the problem appears to originate in a different part of the program. Therefore, to identify the source of the problem, the developer may be forced to follow the program's logic to identify program statements affected by the database statements.

Embodiments of the invention may be used to refactor these (and other) programming language and database constructs within program source code based on changes to the database. Similarly, embodiments of the invention may be used to identify improperly opened/closed database resources and/or incorrectly used database commands embedded within program source code.

In one embodiment, a mapping data structure may be generated to store relationships between database elements, database statements, and program elements within program source code. The mapping data may be used to identify database statements and program elements affected by changes made to the database. Further, the mapping data may be used to, in response of a selection of a database statement, display database elements and program elements that either affect or are affected by the selected database statement. Furthermore, the mapping data may be used along with predefined refactoring rules to refactor the program based on changes to the database.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Additionally, one embodiment of the invention is described herein relative to an IDE tool used to develop a database-aware software application using the Java® programming language. As described, such an IDE tool may be configured to display and refactor program statements affected by database statements. One of ordinary skill in the art will readily recognize, however, that embodiments of the invention may be adapted for use with a wide variety of programming languages that allow database statements to be embedded within program source code. Similarly, embodiments of the invention may be adapted for use with other database query languages.

FIG. 1 is a block diagram that illustrates an example view of a computing environment 100, according to one embodiment of the invention. As shown, computing environment 100 includes computer system 110. Computer system 110 is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Further, although FIG. 1 illustrates a single computer system, those skilled in the art will recognize that embodiments of the invention may be adapted for use on multiple systems configured to communicate over a network. Additionally, those skilled in the art will recognize that the illustration of computer system 110 is simplified to highlight aspects of the present invention and that computing systems and data communication networks typically include a variety of additional elements not shown in FIG. 1.

As shown, computer system 110 includes a processor (or processors) 130, a storage device 120, a network device 150, and a memory 140, all connected by a bus 160. CPU 130 is a programmable logic device that executes user applications (e.g., an IDE tool 142). Computer system 110 may be connected to a display device 190 and one or more input devices 180. Typically, user input devices 180 include a mouse pointing device and a keyboard, and display device 190 is a CRT monitor or LCD display. The processing activity and hardware resources on computer system 110 may be managed by an operating system (not shown). Well known examples of operating systems include the Windows® operating system, distributions of the Linux® operating system, and IBM's AIX and OS/2® operating systems, among others. (Linux is a trademark of Linus Torvalds in the US, other countries, or both). Network device 150 may connect computer system 110 to any kind of data communications network, including both wired and wireless networks.

Storage device 120 stores application programs and data for use by computer system 110. Typical storage devices include hard-disk drives, flash memory devices, optical media, network and virtual storage devices, and the like. As shown, storage device 120 contains a database 122, a development project 124, mapping data 126, and refactoring rules 128. Database 122 may store a collection of data records organized according to a relational schema (e.g., a structure of tables, columns, and keys for organizing data), and may be accessed using SQL database statements. These components of the database schema are generally referred to herein as database elements.

Development project 124 represents a collection of data used to build a software application. For example, development project 124 may include source code files, scripts, etc., along with resources such as fonts, images, build-instructions, and project documentation, etc. Typically, a user (i.e., a developer) may interact with files of development project 124 by using application programs and data files loaded in memory 140.

In one embodiment, memory 140 includes an IDE tool 142 and a project file 144. IDE tool 142 provides a programming environment that assists a computer programmer in developing software. IDE tool 142 may include a source code editor, a compiler and/or interpreter, build-automation tools, and a debugger (not shown). Other components provided by IDE tool 142 may include a version control system, a class browser, an object inspector and, a class hierarchy diagram generator, and a variety of other utilities.

Project file 144 represents a file included in development project 124 that is being edited by a developer using IDE tool 142, e.g., a source code file of a database-aware software application. IDE tool 142 may display the text of the source code to the developer on display device 190 and provide an interface that allows the user to edit project file 144. One embodiment of IDE 142 is illustrated in FIG. 2.

FIG. 2 illustrates an example screen display generated by IDE 142, according to one embodiment of the invention. In this example, the IDE displays program source code 200 that includes database statements embedded within source code 200. As shown, source code 200 is displayed with a set of line numbers 210 and a set of program statements 220 for a Java program named "SampleProgram," which may represent a project file 144. Source code 200 includes program statements for opening and closing database resources (e.g., database connections, database query result accessors, and the like). For example, lines 0060 and 0070 are program statements that open a database connection to the database-"myDB" using the "connection" object named "con." The connection "con" to the "myDB" database is closed by the program statement in line 0170. Line 0160 includes the command "updateRow," which performs an update to the database. As described, program source code may frequently include statements such as these for interacting with the database. In this example, lines 0060, 0070, 0160 and 0170 include database statements as part of program source code 200, since they include database commands used to interact with the database "myDB."

Additionally, program source code may include embedded text strings of database query commands which enable a program to retrieve data from, or update/insert data into, a database. For example, line 0090 is a program statement that sets the expression "rs" equal to a set of query results. The query results are retrieved by an embedded database statement 230. In this example, database statement 230 is an SQL query: "SELECT NAME FROM PERSONNEL." The column "NAME" and table "PERSONNEL" are elements of the database "myDB." The query results "rs" are used in line 0110, which sets the variable "s" equal to the "NAME" column value for the first row of the query results. Since line 0110 depends on the query results "rs" retrieved by database statement 230, line 0110 can be described as being "affected by" database statement 230. Note that the query results "rs" are also used in lines 0140 and 0160, resulting in an update to the "NAME" column. Note also that line 0130 generates the variable "full_name," which is used to update the column "NAME." Thus, lines 0130, 0140 and 0160 may also be described as "affecting" database elements, namely the column "NAME."

Returning to FIG. 1, in one embodiment, mapping data 126 provides a data structure that describes relationships between database statements and program statements. For example, assume that mapping data 126 is generated for the source code 200 illustrated in FIG. 2. In such a case, mapping data 126 may include a relationship that describes line 0110 as being affected by database statement 230. Mapping data 126 may also include a relationship describing column "NAME" as being affected by lines 0140 and 0160. Further, it is contemplated that mapping data 126 may describe relationships for elements of program code such as expressions and variables. For example, mapping data 126 generated for source code 200 may include the expression "rs" and the variable "full_name" as affecting the column "NAME."

In one embodiment, mapping data 126 may be generated at fixed times, and may be stored for later use. In another embodiment, mapping data 126 may be regenerated each time program source code is to be evaluated for factoring. Mapping data 126 may be generated using known techniques such as static analysis, dataflow analysis, and the like.

Figure 3:
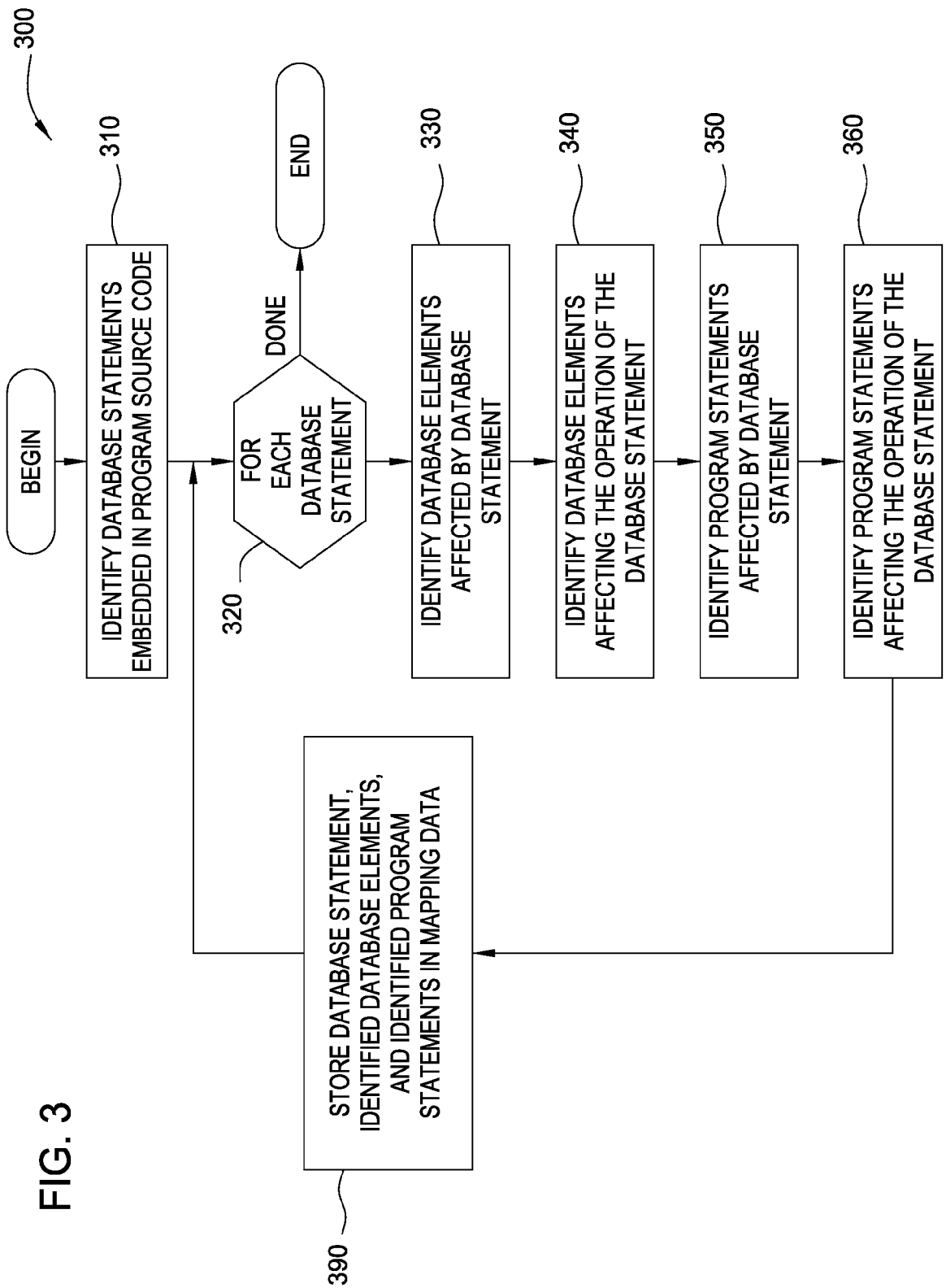
FIG. 3 illustrates a method for generating mapping data for a program that includes database statements, according to one embodiment of the invention.

FIG. 3 illustrates a method 300 for generating mapping data for a program that includes database statements, according to one embodiment of the invention. Persons skilled in the art will understand that, even though the method is described in conjunction with the system of FIG. 1, any system configured to perform the steps of method 300, in any order, is within the scope of the present invention.

As shown, method 300 begins at step 310, where database statements embedded in program source code may be identified. For example, IDE tool 142 illustrated in FIG. 1 may be configured to identify database statements in program source code (e.g., database statement 230 illustrated in FIG. 2). At step 320, the method 300 enters a loop (defined by steps 330, 340, 350, 360 and 390) for processing each such statement identified at step 310. At step 330, database elements that are affected by the database statement are identified. The affected database elements include elements of the database that receive data from the database statement. For example, any tables and columns of database 122 that are affected by the database statement may be identified at step 330. At step 340, database elements that affect the operation of the database statement are identified, meaning the database elements that provide data to the database statement. Referring to the example illustrated in FIG. 2, the table "PERSONNEL" and column "NAME" affect the operation of the database statement 230, and would thus be identified at step 340.

At step 350, program statements that are affected by the database statement are identified. The affected program statements may be program statements that receive data from the database statement. For example, any program statements of project file 144 that include a variable storing a value retrieved by the database statement may be identified at step 350 (e.g., line 0110 of source code 200). At step 360, program statements that affect the operation of the database statement are identified. For example, a program statement of project file 144 that generates a value that may be written to database 122 by the database statement may be identified at step 360 (e.g., line 0140 of source code 200).

At step 390, the current database statement, the database elements identified at steps 330 and 340 and elements of the program identified at steps 350 and 360 are stored in a mapping data structure, e.g., mapping data 126 illustrated in FIG. 1. Once each database statement embedded in the program source code has been evaluated (step 320) the method 300 ends.

Returning again to FIG. 1, refactoring rules 128 represent predefined rules that specify how program statements affected by database statements may be refactored (i.e., altered or corrected) to address changes in the database statements. For example, assume a database statement retrieves a value from a database column "COST," and assigns the value to a variable "X". In the event that the database column is renamed "VALUE," and the database statement is not changed as well, the variable "X" will not receive the proper value. In such a case, a refactoring rule 128 may specify that, in response to a column being renamed, any database statements referring to that column should be refactored by replacing the old column name with the new column name. In one embodiment, refactoring rules 128 may be configured to generate a proposed refactoring which is presented to a developer. The developer may accept, modify, or reject the proposed refactoring. If the proposed refactoring is accepted or modified, it may be applied to project file 144. Alternatively, refactoring rules 128 may be configured to automatically perform the proposed refactoring, without requiring any interaction with the developer.

Of course, the above description of mapping data 126 and refactoring rules 128 is provided for illustrative purposes, and is not intended to be limiting of the scope of the invention. Other embodiments are also contemplated. For example, mapping data 126 may only include relationships between program statements and database statements. Alternatively, mapping data 126 and refactoring rules 128 may be stored in a single data structure. Also, while mapping data 126 and refactoring rules 128 are illustrated as being stored in storage device 120, one of skill in the art will recognize that these objects may be moved in and out of memory 140 as necessary.

Figure 4:
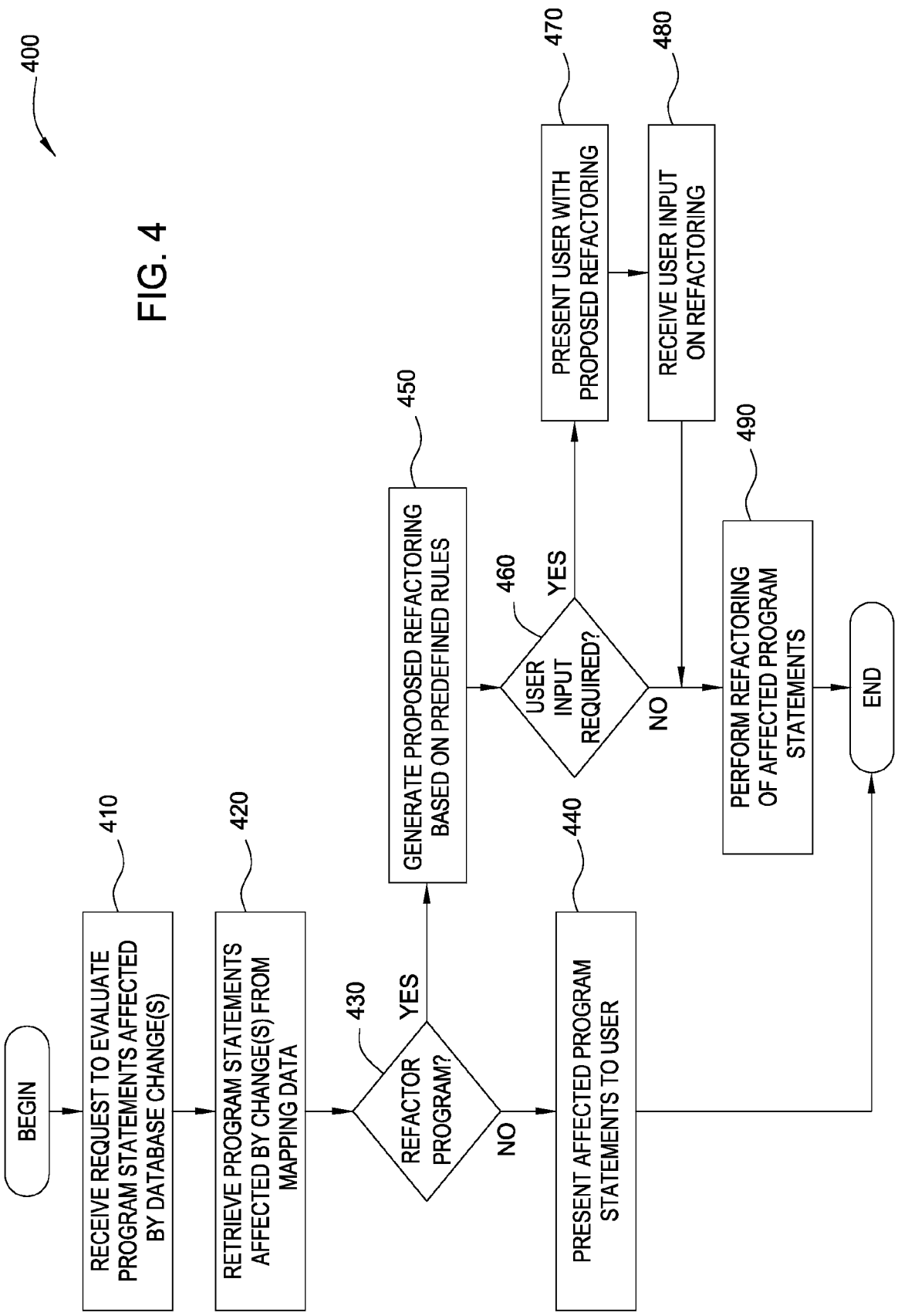
FIG. 4 illustrates a method for using mapping data and refactoring rules to evaluate program statements affected by database changes, according to one embodiment of the invention.

FIG. 4 illustrates a method 400 for using mapping data 126 and refactoring rules 128 to evaluate program statements affected by database changes, according to one embodiment of the invention. Persons skilled in the art will understand that, even though the method is described in conjunction with the system of FIG. 1, any system configured to perform the steps of method 400, in any order, is within the scope of the present invention.

As shown, method 400 begins at step 410, where a request is received to evaluate a program that may need to be refactored as a result of changes to a database. For example, a developer using IDE tool 142 may request to evaluate statements of project file 144 that are affected by a change to the "NAME" column of database 122. At step 420, program statements that may be affected by changes to the database may be determined from mapping data 126. As described above, mapping data 126 may store information indicating relationships between database statements embedded in program source code (e.g., an SQL query), program statements (e.g., a variable assigned values from database query results) and to database elements (e.g., columns and tables accessed by database statements). Thus, mapping data 126 may be used to follow relationships linking changes to a database element to database statements that may be affected by the change. Thereafter, mapping data 126 may be used to follow relationships of the affected database statements to affected program statements.

At step 430, it is determined whether the program will be refactored according to one or more refactoring rules 128. This determination may be made by a user, for example a developer interacting with IDE tool 142. Alternatively, this determination may be based on the availability of refactoring rules 128 that are configured to recognize a given type of change to the database. If it is determined that the program is not to be refactored, the method 400 continues at step 440, where the affected program statements may be presented to the user. The affected program statements may be shown in isolation (i.e., without showing other program statements). Optionally, the affected program statements may be shown as part of a list of source code having a visual indicator for the affected statements. Referring to FIG. 2, for example, source code 200 may be presented such that affected program statements are highlighted in IDE tool 142.

On the other hand, if it is determined at step 430 to refactor the program, the method 400 continues at step 450, where a proposed refactoring is generated according to refactoring rules (e.g., refactoring rules 128 illustrated in FIG. 1). At step 460, it is determined if any input from a user is required. That is, whether the proposed refactoring must be approved or modified by the user. If so, the method 400 continues at step 470, where the user is presented with the proposed refactoring. This step may be performed, for example, in IDE tool 126 illustrated in FIG. 2. At step 480, the user input (i.e., approval or modification) on the proposed refactoring is received. The method 400 then continues at step 490. On the other hand, if it determined at step 460 that no user input is required, method 400 continues directly at step 490, where the refactoring of the affected program statements is performed.

Figure 5:
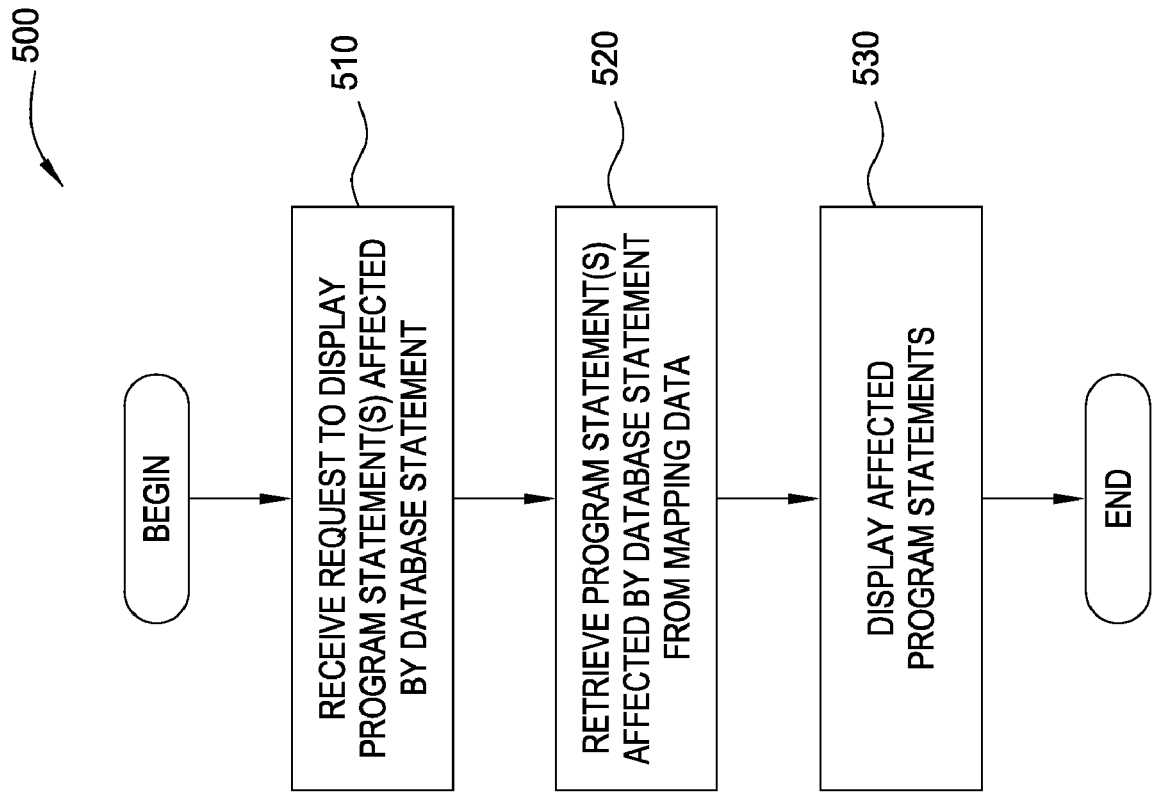
FIG. 5 illustrates a method for using mapping data to display program statements affected by a database statement, according to one embodiment of the invention.

FIG. 5 illustrates a method 500 for using mapping data 126 to display program statements affected by a database statement, according to one embodiment of the invention. Persons skilled in the art will understand that, even though the method is described in conjunction with the system of FIG. 1, any system configured to perform the steps of method 500, in any order, is within the scope of the present invention.

As shown, method 500 begins at step 510, by receiving a request to display program statements affected by a database statement. For example, a developer using IDE tool 142 may select a database statement included in project file 144 and select a command to display statements of project file 144 that are affected by the selected database statement. At step 520, program statements that are affected by the database statement may be retrieved from mapping data (e.g., mapping data 126). Mapping data 126 may be used to follow relationships linking a selected database statement to affected program statements. At step 530, the program statements affected by the database statement may be presented to the user. For example, affected program statements may be presented to a developer using IDE tool 142. The affected program statements may be shown in isolation, or by visual indicators shown in a source code listing.

Figure 6:
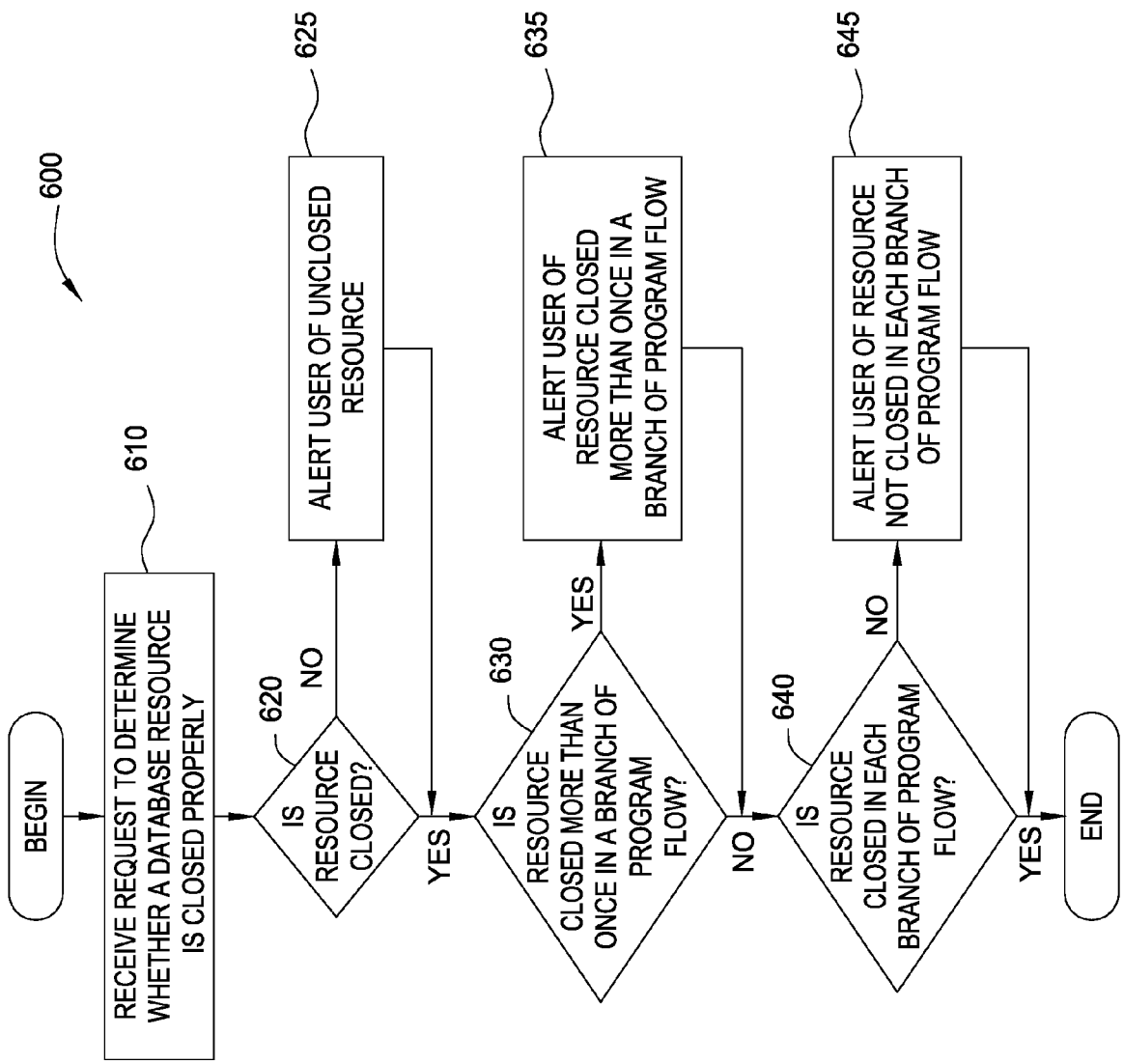
FIG. 6 illustrates a method for using mapping data to determine if database resources are closed properly, according to one embodiment of the invention.

In addition to identifying what statements of program source code are affected by a database statement, the IDE tool may be configured to evaluate the use of database statements within the program source code. For example, program connections to database resources usually need to be opened, and closed, correctly for a program to function properly. FIG. 6 illustrates a method 600 for using mapping data 126 to determine if database resources are closed properly, according to one embodiment of the invention. Persons skilled in the art will understand that, even though the method is described in conjunction with the system of FIG. 1, any system configured to perform the steps of method 600, in any order, is within the scope of the present invention.

As shown, method 600 begins at step 610, by receiving a request to determine whether a given database resource included in a program is closed properly. For example, a developer using IDE tool 142 may select line 0070 which opens a database resource, and may select a command to determine whether the database resource is closed properly. At step 620, it is determined whether the selected resource is not closed, meaning that no statement included in the program closes the database resource. If so, method 600 continues at step 625, where an alert that the resource is not closed may be presented to the user. If not, method 600 continues at step 630.

At step 630, it is determined whether the selected resource is closed more than once in one branch of the program flow, meaning that two or more statements included in one execution path of the program function to close the connection. If not, the method 600 continues at step 640. Otherwise, at step 635, an alert that the resource is closed more than once in one branch may be presented to the user. At step 640, it is determined whether the selected resource is closed in each branch of the program flow. If not, the method 600 continues at step 645, where an alert of a resource not being closed in a branch may be presented to the user. Otherwise, the method 600 ends.

Advantageously, embodiments of the invention enable displaying program statements affected by database statements. Currently, database statements are routinely ignored by IDE tools, forcing the developer to follow program logic manually. Also, embodiments of the invention enable refactoring programs including database statements. Since current IDE tools are not configured to aid this function, programs including database statements must be refactored manually by a developer. Thus, embodiments of the invention may facilitate developing and debugging programs including database statements.

While the foregoing is directed to embodiments of the present invention, other and further embodiments of the invention may be devised without departing from the basic scope thereof, and the scope thereof is determined by the claims that follow.

What is claimed is:

1. A computer-implemented method for refactoring source code of an application in response to changes to a database accessed by the application, comprising:
    detecting, by operation of one or more processors, a change to an element of the database;
    identifying one or more database statements embedded in the source code of the application;
    examining each of the one or more database statements embedded in the source code of the application using a mapping data structure to at least one of: identify statements of the source code affected by the changed element of the database, and identify statements of the source code affecting the changed element of the database, wherein the mapping data structure is configured to store relationships between elements of the database, the one or more database statements and the statements of the source code; and
    presenting an indication of the identified statements of the source code.

2. The method of claim 1, wherein the element of the database comprises one of a table, a column, and an index of the database.

3. The method of claim 1, wherein presenting an indication of the identified statements of the source code comprises displaying the identified statements in a graphical interface provided by an integrated development environment (IDE) tool.

4. The method of claim 1, further comprising:
    determining a proposed refactoring for at least one of the identified statements of the source code; and
    displaying the proposed refactoring.

5. The method of claim 4, wherein the proposed refactoring is determined according to one or more predefined refactoring rules.

6. The method of claim 1, further comprising:
    receiving a selection of a first statement of the source code;
    determining at least one of: one or more elements of the database affected by the selected first statement, and one or more elements of the database affecting the selected first statement; and
    presenting an indication of the determined one or more elements of the database.

7. The method of claim 6, wherein the first statement of the source code specifies an opening of a database resource, and wherein the method further comprises:
    determining, for each execution path through the source code, whether a second statement of the source code specifies exactly one closing of the database resource; and
    upon determining that a second statement of the source code does not specify exactly one closing of the database resource for each execution path through the source code, presenting an indication that the database resource is not properly closed in the source code.

8. The method of claim 1, further comprising:
    identifying one or more source code statements, each opening a database resource;

for each of the one or more source code statements, determining a status indicating whether:
(i) the database resource is not closed,
(ii) the database resource is closed more than once in an execution path through the source code, or
(iii) the database resource is not closed in each execution path through the source code; and
notifying a user of the determined status for each of the one or more source code statements.

9. A computer-readable storage medium containing a program, which, when executed performs an operation for refactoring source code of an application in response to changes to a database accessed by the application, the operation comprising:
detecting a change to an element of the database;
identifying one or more database statements embedded in the source code of the application;
evaluating each of the one or more database statements embedded in the source code of the application using a mapping data structure to at least one of: identify statements of the source code affected by the changed element of the database and identify statements of the source code affecting the changed element of the database, wherein the mapping data structure is configured to store relationships between elements of the database, the one or more database statements and the statements of the source code; and
presenting an indication of the identified statements of the source code.

10. The computer-readable storage medium of claim 9, wherein the element of the database comprises one of a table, a column, and an index of the database.

11. The computer-readable storage medium of claim 9, wherein presenting an indication of the identified statements of the source code comprises displaying the identified statements in a graphical interface provided by an integrated development environment (IDE) tool.

12. The computer-readable storage medium of claim 9, wherein the operation further comprises:
determining a proposed refactoring for at least one of the identified statements of the source code; and
displaying the proposed refactoring.

13. The computer-readable storage medium of claim 12, wherein the proposed refactoring is determined according to one or more predefined refactoring rules.

14. The computer-readable storage medium of claim 9, wherein the operation further comprises:
receiving a selection of a first statement of the source code;
determining at least one of: one or more elements of the database affected by the selected first statement, and one or more elements of the database affecting the selected first statement; and
presenting an indication of the determined one or more elements of the database.

15. The computer-readable storage medium of claim 14, wherein the first statement of the source code specifies an opening of a database resource, and wherein the operation further comprises:
determining, for each execution path through the source code, whether a second statement of the source code specifies exactly one closing of the database resource; and
upon determining that a second statement of the source code does not specify exactly one closing of the database resource for each execution path through the source code, presenting an indication that the database resource is not properly closed in the source code.

16. The computer-readable storage medium of claim 9, wherein the operation further comprises:
identifying one or more source code statements, each opening a database resource;
for each of the one or more source code statements, determining a status indicating whether:
(i) the database resource is not closed,
(ii) the database resource is closed more than once in an execution path through the source code, or
(iii) the database resource is not closed in each execution path through the source code; and
notifying a user of the determined status for each of the one or more source code statements.

17. A system, comprising:
a processor; and
a memory containing a program, which when executed on the processor, is configured to perform an operation for refactoring source code of an application in response to changes to a database accessed by the application, by performing steps of:
detecting a change to an element of the database;
identifying one or more database statements embedded in the source code of the application;
evaluating each of the one or more database statements embedded in the source code of the application using a mapping data structure to at least one of: identify statements of the source code affected by the changed element of the database, and identify statements of the source code affecting the changed element of the database, wherein the mapping data structure is configured to store relationships between elements of the database, the one or more database statements and the statements of the source code; and
presenting an indication of the identified statements of the source code.

18. The system of claim 17, wherein the element of the database comprises one of a table, a column, and an index of the database.

19. The system of claim 17, wherein presenting an indication of the identified statements of the source code comprises displaying the identified statements in a graphical interface provided by an integrated development environment (IDE) tool.

20. The system of claim 17, wherein the steps further comprise:
determining a proposed refactoring for at least one of the identified statements of the source code; and
displaying the proposed refactoring.

21. The system of claim 20, wherein the proposed refactoring is determined according to one or more predefined refactoring rules.

22. The system of claim 17, wherein the steps further comprise:
receiving a selection of a first statement of the source code;
determining at least one of: one or more elements of the database affected by the selected first statement, and one or more elements of the database affecting the selected first statement; and
presenting an indication of the determined one or more elements of the database.

23. The system of claim 22, wherein the first statement of the source code specifies an opening of a database resource, and wherein the steps further comprise:

determining, for each execution path through the source code, whether a second statement of the source code specifies exactly one closing of the database resource; and upon determining that a second statement of the source code does not specify exactly one closing of the database resource for each execution path through the source code, presenting an indication that the database resource is not properly closed in the source code.

24. The system of claim 17, wherein the steps further comprise:

identifying one or more source code statements, each opening a database resource;

for each of the one or more source code statements, determining a status indicating whether:

(i) the database resource is not closed, (ii) the database resource is closed more than once in an execution path through the source code, or (iii) the database resource is not closed in each execution path through the source code; and notifying a user of the determined status for each of the one or more source code statements.

* * * * *